United States Patent Office 3,138,728
Patented June 23, 1964

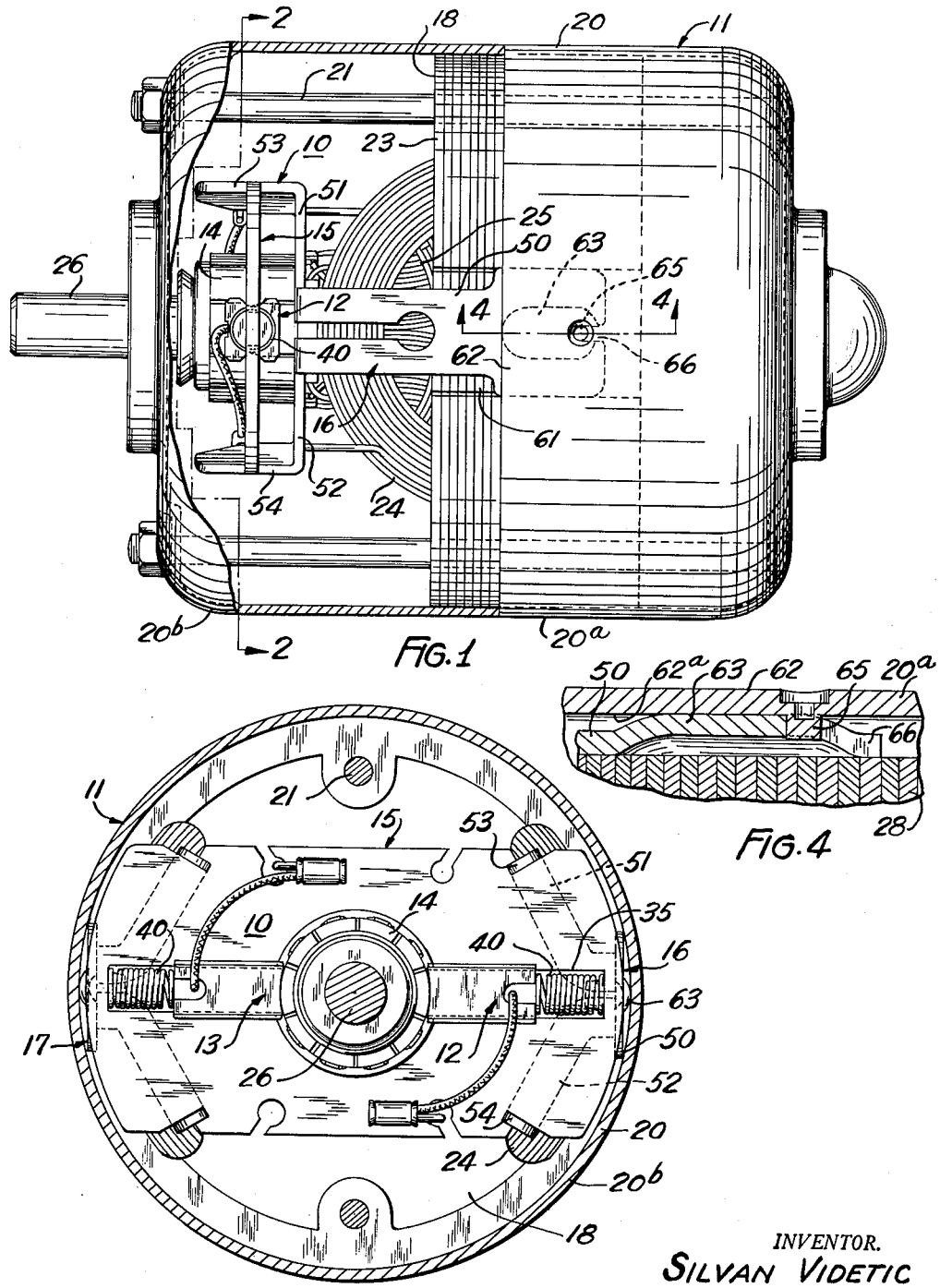
June 23, 1964     S. VIDETIC     3,138,728
DYNAMO-ELECTRIC MACHINE BRUSH RIGGING
Filed July 28, 1961     2 Sheets-Sheet 1
INVENTOR.
SILVAN VIDETIC
BY
Williams, David, Hoffmann & Yount
ATTORNEYS

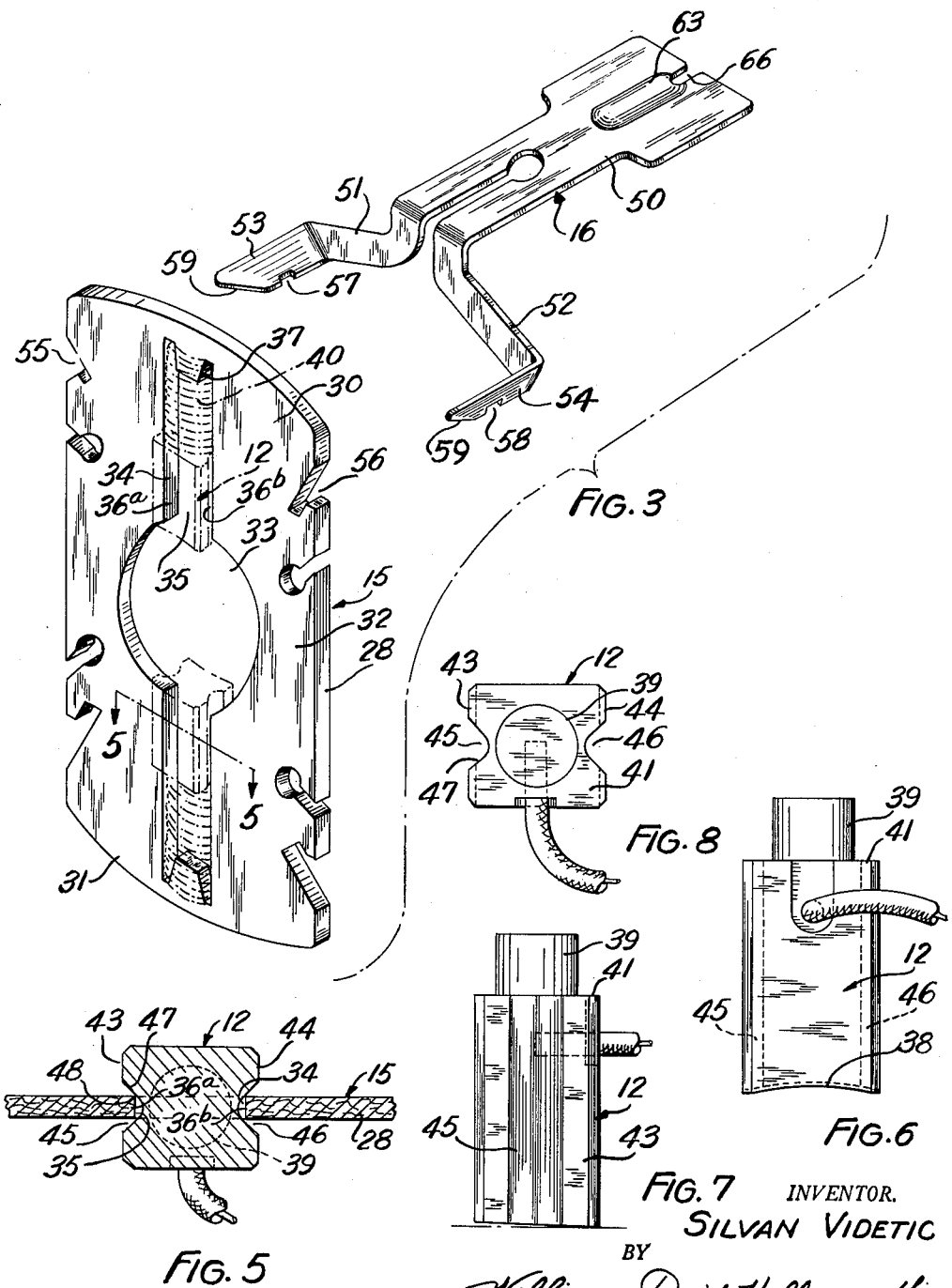

3,138,728
DYNAMO-ELECTRIC MACHINE BRUSH RIGGING
Silvan Videtic, Wickliffe, Ohio, assignor to The Leece-Neville Company, Cleveland, Ohio, a corporation of Ohio
Filed July 28, 1961, Ser. No. 127,609
9 Claims. (Cl. 310—239)

This invention relates to brush rigging for electrical machines.

An object of this invention is to provide a novel brush rigging of a simplified form as compared with riggings heretofore available and one which can be more economically produced and more readily assembled.

Another object is to provide a novel brush holder in the form of web means made of insulating material and having guideway means for a slidable brush formed solely by portions of the web means.

A further object is to provide novel brush rigging comprising a holder in the form of the web means just mentioned and whose guideway means includes opposed edge portions of the web means extending therealong, and a brush having grooves in the sides thereof and retained in the guideway means by the engagement of the edge portions in such grooves.

Additionally, this invention provides novel brush rigging employing a construction by which arm portions of brush holder support brackets can be more readily and satisfactorily connected with the structure of the electrical machine.

Other objects, novel characteristics and advantages of this invention will be apparent in the following detailed description and in the accompanying drawings forming a part of this specification and in which, FIG. 1 is a side elevation of an electrical machine equipped with the novel brush rigging of this invention and with portions of the housing of the machine broken away;

FIG. 2 is a transverse vertical section through the machine adjacent the commutator end thereof and taken on section line 2—2 of FIG. 1;

FIG. 3 is an expanded perspective view showing the brush holder and one of the brush holder support brackets in a detached relation;

FIG. 4 is a fragmentary sectional view, on a larger scale and taken on section line 4—4 of FIG. 1, showing the cooperation of one of the bracket arms with the machine structure;

FIG. 5 is a partial transverse section through the brush holder as indicated by section line 5—5 of FIG. 3 and showing the slidable co-operation between one of the brushes and its associated guideway means;

FIG. 6 is a side elevation of one of the brushes in detached relation and as seen from one of the flat sides thereof;
flat sides thereof;

FIG. 7 is another side elevation of such brush as seen from one of the grooved sides thereof; and FIG. 8 is an end view of such brush.

In FIGS. 1 and 2 of the accompanying drawings the novel brush rigging 10 of this invention is incorporated in an electrical machine 11 for supporting a pair of brushes 12 and 13 in a co-operative relation to a commutator 14. The brush rigging 10 comprises, in general, a brush holder 15 and a pair of support brackets 16 and 17 for supporting the holder and connecting the same with the stator structure 18 of the machine 11.

The machine 11 can be any dynamoelectric machine and is here shown as being an electric motor whose stator structure 18 includes a housing 20 formed by a pair of complemental cup-shaped housing members 20$^a$ and 20$^b$ held in connected relation by clamping rods 21 extending therethrough. The housing 20 is provided at opposite ends thereof with suitable shaft-receiving bearings. The stator structure 18 also comprises a stator core 23 disposed in the housing 20 and carrying suitable field coils 24. An armature 25 having a shaft 26 rotatable in the bearings of the housing 20 carries the commutator 14.

The holder 15 is in the form of a flat-plate web means 28 and, because of its generally flat and thin character, is at times referred to as a brush card. The holder 15 is made of electric insulating material of a suitable type such as fibrous sheet material impregnated with a suitable resin or the like, or can be molded from a suitable plastic insulating material.

The holder 15 is of a generally rectangular plan shape having oppositely extending flat end portions 30 and 31 connected by a flat intermediate portion 32 and all of which portions lie in a common plane. The intermediate portion 32 is provided with a circular opening 33 of a size to accommodate the commutator 14 with running clearance therearound. The end portions 30 and 31 have guideway means 34 thereon for the brushes 12 and 13 and which guideway means is of the same form for both brushes and co-operates therewith in the same manner.

The guideway means 34 comprises a guide slot 35 communicating with the opening 33 and extending outwardly into the end portion 30 in a direction away from such opening. In the holder 15, as here shown, the slots 35 extend in a radially outward direction from the opening 33 and are located in a diametrically opposed relation to each other.

The guideway means 34 comprises, in addition to the slot 35, a pair of guide elements 36$^a$ and 36$^b$ formed by opposed edge portions of the web means 28 and extending along opposite sides of the slot 35. As shown in FIG. 3 the slot 35 has the outer end thereof closed, that is, lying inward of the perimeter of the web means 28 and provided with a spring retainer element 37. The retainer element 37 is in the form of a projection on the end portion 30 and extending into the slot 35 for use in a manner to be explained hereinafter.

The brushes 12 and 13 are similar in size and shape and co-operate in a similar manner with the guideway means 34 of the holder 15. Only the brush 12 need be described in detail and comprises a solid elongated body of a generally quadrangular cross-sectional shape made of suitable electrically conducting material such as a molded carbon composition. The inner end of the brush 12 has a portion 38 which is curved or otherwise suitably shaped to co-operate with the commutator 14.

At the outer end thereof, the brush 12 is provided with a projection 39 of a size and shape to extend into a coil spring 40 by which the brush is shiftable in the slot 35 in an inward direction to press the end portion 38 thereof against the commutator 14. Shoulder means 41 provided on the brush 12 adjacent the projection 39 forms a seat for the inner end of the spring 40. The spring 40 is of a size to be received in the slot 35 and has its outer end telescoped over the projection 37 as a retainer element for such outer end.

The two opposed sides 43 and 44 of the brush 12 which lie adjacent the opposite sides of the slot 35 are provided with longitudinal grooves 45 and 46 into which the guide elements 36$^a$ and 36$^b$ of the holder 15 extend as shown in FIG. 5. The grooves 45 and 46 can be of any appropriate cross-sectional shape for effective co-operation with the guide elements 36$^a$ and 36$^b$ but preferably have beveled side walls 47 disposed at a suitable angle so as to be engaged by the corners 48 of the edge portions forming the guide elements 36$^a$ and 36$^b$. The engagement of the beveled sides 47 with the corners 48 only of the guide elements 36$^a$ and 36$^b$ reduces the frictional drag between the brush 12 and the holder 15 so that the inner end portion 38 of the brush will always be maintained in the desired engagement with the commutator 14 by the spring 40, even though this spring is one having a relatively low rate.

The brush 12 is insertable into the slot 35 by movement thereinto through the opening 33 prior to the holder 15 being placed in its final assembly position in the machine 11. Such assembly position of the holder 15 and the connection thereof with the structure of the machine 11 by means of the support brackets 16 and 17 will be described next.

As shown in FIGS. 1 and 2 the holder 15 lies in a plane extending transverse to the rotation axis of the commutator 14 and is supported in this location by engagement of the end portions 30 and 31 with the mounting brackets 16 and 17. The mounting brackets 16 and 17 are located on diametrically opposite sides of the commutator 14 and, since they are identical in form and are attached to the machine structure 18 in the same manner, one only of these brackets need be described in detail.

The mounting bracket 16 comprises an arm 50 having fork members 51 and 52 at one end thereof carrying connecting fingers 53 and 54 for engagement with the holder 15. The fingers 53 and 54 extend in the same general direction from the fork members 51 and 52 but are located in convergently inclined planes so as to be engageable in a pair of inclined slots 55 and 56 provided in the side edges of the end portion 30 of the holder 15. The fingers 53 and 54 are also provided with notches 57 and 58 of a width only slightly greater than the thickness of the holder 15 so that, when the fingers are engaged in the slots 55 and 56, the notches 57 and 58 will receive portions of the holder located at the bottoms of these slots to produce an interlocked condition between the holder and the fingers.

The fork portions 51 and 52 are flexible in character and the fingers 53 and 54 have beveled front edges 59 on the outer ends thereof so that assembly of the holder 15 with the bracket 16 can be readily produced by merely pushing the holder into the space between the fingers 53 and 54, so as to bring the fingers into the slots 55 and 56 and to also bring portions of the holder into engagement in the notches 57 and 58. The flexible character of the forked portions 51 and 52 will cause the fingers 53 and 54 to be urged inwardly and downwardly of the slots 55 and 56 for maintaining the interlocked connection between these fingers and the holder 15.

To accommodate the arms 50 of the brackets 16 and 17, the core 23 is provided with shallow axially extending slots 61 in the periphery thereof at diametrically opposed locations corresponding with the diametrically opposed positions desired for the brushes 12 and 13. The slot 61 is of a width and depth to slidably receive the arm 50 of the bracket 16 in the relation shown in the drawings.

The slot 61 is spanned transversely thereof by a curved segment 62 of the housing member 20ª and, when the arm 50 is inserted into the slot 61, the segment 62 cooperates with the arm for retaining the same engaged in the slot. To better enable the housing segment 62 to thus retain the arm 50 in the slot 61, the arm is provided with a bulged portion forming an abutment boss 63 thereon which is engageable with, and slidable along, the inner surface 62ª of the curved segment 62 when the arm 60 is inserted into the slot 61.

Axial positioning of the holder 15 relative to the commutator 14 lengthwise of the latter is accomplished by providing stop projections 65 on the housing member 20ª at diametrically opposed points corresponding with the locations of the slots 61 of the stator core 23. The stop projections 65 can be of any desired form and are here shown as comprising metal displaced inwardly from the wall of the housing member 20ª by a partial shearing of such wall.

The arm 50 of the bracket 16 is provided with an axially extending slot 66 in the inner end thereof for receiving the stop projection 65. The slot 66 extends partway into the abutment boss 63 so that when the stop projection 65 enters the slot 66 and is engaged by the abutment boss, the bracket 16 will be located on the stator structure 18 of the machine 11 in the desired location to position the holder 15 in its proper relation to the commutator 14.

From the accompanying drawings and the foregoing detailed description it will now be readily recognized that this invention provides novel brush rigging for an electrical machine which can be economically produced and readily assembled. It will now also be seen that the brush holder of the rigging comprises a one-piece member of an extremely simple form and whose guideway means for the brushes comprises edge portions of such holder engaging in grooves of the brushes so that no separately formed and attached guideway members are needed on the holder. Additionally, it will be recognized that the brush rigging of this invention provides a novel construction by which the holder for the brushes can be quickly and satisfactorily attached to the stator structure of the electrical machine.

Although the brush rigging of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In brush rigging for a dynamoelectric machine having a commutator, a holder having an opening of a size to receive said commutator therein with rotation clearance therearound, means adapted for connection with said machine for supporting said holder in a plane extending transverse to the rotation axis of the commutator, said holder comprising web means made of insulating material and having guideway means defined solely by portions of the web means and being connected with said opening and disposed so as to extend in an outward direction therefrom, brush means slidable in said guideway means, spirng means engaging said brush means for pressing the same against said commutator, and retainer means for said spring means defined solely by portions of the web means and disposed within, and at each outer end of said guideway means.

2. Brush rigging as defined in claim 1 wherein said web means has edge portions extending along opposite sides of said guideway means, said brush means having grooves in opposite sides thereof in which said edge portions are received.

3. In brush rigging for a dynamoelectric machine having a commutator and brush card support means; a substantially flat brush card comprised of insulating material and having an opening of a size and shape to receive said commutator with rotation clearance; said card being adapted for connection with said support means to be supported thereby in a plane extending transverse to the rotation axis of the commutator; said card having slot means in communication with, and extending away from, said opening; portions of the card on opposite sides of said slot means forming a pair of guide elements therealong; brush means slidable in said slot means and having grooves in which said guide elements are received; spring means engaging said brush means for pressing the same against said commutator and portions of the card at the outer ends of said slot means forming projection means for retaining the outer ends of the spring means in position.

4. In brush rigging for a dynamoelectric machine having a commutator and brush card support means; a substantially flat brush card comprised of insulating material and having an opening of a size and shape to receive said commutator with rotation clearance; said support means having fork members and connecting fingers on said fork members, said card having pairs of inclined slots being adapted for connection with said connecting fingers of said support means to be supported thereby in a plane extending transverse to the rotation axis of said commutator; said card having slots in communication with, and extending away from, said opening; edge portions of the card on opposite sides of said slots forming pairs of guide elements; brushes slidable in said slots and having grooves in the sides thereof into which said guide elements extend; coil springs engaging said brushes for pressing the adjacent ends thereof against said commutator; and spring retainer elements formed by portions of said card projecting into said slots at the outer ends thereof and engaged in said springs.

5. An assembly as defined in claim 4 wherein said guide elements comprise edge portions of said card, and said brushes have channel grooves in opposite sides thereof into which said edge portions extend.

6. In an electrical machine; a housing having bearings therein and comprising connected housing members; a stator comprising a core provided with shallow axially extending slots in the periphery thereof; said stator being received in said housing with portions of the housing spanning said slots; an armature rotatable in said bearings and having a commutator; a brush holder extending transverse to the rotation axis of said commutator; brushes in said holder and engaging said commutator; support brackets having said holder connected therewith and including arm members having end portions thereof received between said core and said spanning portions of the housing and engaged in said slots; and co-operably engageable holding elements on said spanning portions and arm members for retaining the latter in predetermined assembly position.

7. An electrical machine as defined in claim 6 wherein said arm members have recesses extending axially along the end portions thereof; said elements comprising abutment bosses on said end portions adjacent said recesses, and projection bosses on said housing; said projection bosses being receivable in said recesses and engageable with said abutment bosses upon insertion of said arm members into the slots of said core.

8. Brush rigging as defined in claim 2 wherein said edge portions of the web means have corners, and said grooves of the brush means have beveled side walls disposed at a predetermined angle and adapted to slidingly engage the corners only of the web means.

9. Brush rigging as defined in claim 1 and comprising shoulder means on the brush means, said spring means being of the coiled compression-spring type and disposed in the guideway means between said shoulder means and said retainer means, said retainer means extending partially into the outer ends of the spring means.

References Cited in the file of this patent
UNITED STATES PATENTS

| | | |
|---|---|---|
| 2,372,749 | Taylor | Apr. 3, 1945 |
| 2,629,061 | Swarthout | Feb. 17, 1953 |
| 2,763,800 | Curley | Sept. 18, 1956 |
| 2,780,744 | Carneck | Feb. 5, 1957 |
| 2,842,692 | Johnson | July 8, 1958 |
| 3,003,074 | Finsterwalder | Oct. 3, 1961 |